United States Patent
Agarkov et al.

(10) Patent No.: US 9,724,850 B2
(45) Date of Patent: Aug. 8, 2017

(54) METHOD OF MANUFACTURING AN ARTIFICIAL ELASTIC IMPLANT FOR RESTORATIVE AN RECONSTRUCTIVE SURGERY

(71) Applicant: IconLab USA, Inc., Aliso Viejo, CA (US)

(72) Inventors: Viacheslav Agarkov, Aliso Viejo, CA (US); Igor Uspenskiy, Nizhniy Novgorod (RU); Yury Kolmogorov, Nizhniy Novgorod (RU)

(73) Assignee: IconLab, USA, Inc., Aliso Viejo, CA (US)

( * ) Notice: Subject to any disclaimer, the term of this patent is extended or adjusted under 35 U.S.C. 154(b) by 486 days.

(21) Appl. No.: 14/504,355

(22) Filed: Oct. 1, 2014

(65) Prior Publication Data
US 2016/0096292 A1   Apr. 7, 2016

(51) Int. Cl.
| | |
|---|---|
| B29C 35/08 | (2006.01) |
| B29C 43/00 | (2006.01) |
| B29K 33/04 | (2006.01) |
| B29L 31/00 | (2006.01) |

(52) U.S. Cl.
CPC ...... *B29C 35/0894* (2013.01); *B29C 35/0805* (2013.01); *B29C 43/003* (2013.01); *B29C 2035/0827* (2013.01); *B29K 2033/04* (2013.01); *B29K 2995/0026* (2013.01); *B29K 2995/0027* (2013.01); *B29L 2031/7532* (2013.01)

(58) Field of Classification Search
None
See application file for complete search history.

(56) References Cited

U.S. PATENT DOCUMENTS

| | | | | |
|---|---|---|---|---|
| 5,495,029 A | * | 2/1996 | Steinmann | C07C 271/12 430/280.1 |
| 5,624,332 A | * | 4/1997 | Dalton | A63B 45/00 156/273.3 |
| 5,725,576 A | * | 3/1998 | Fedorov | A61L 27/18 351/159.01 |
| 5,763,503 A | * | 6/1998 | Cowperthwaite | B29C 35/0888 522/173 |
| 6,201,036 B1 | * | 3/2001 | Fedorov | A61F 2/16 264/1.1 |

* cited by examiner

*Primary Examiner* — Christina Johnson
*Assistant Examiner* — Mohammad M Ameen
(74) *Attorney, Agent, or Firm* — Buchalter

(57) ABSTRACT

A method for manufacturing an artificial elastic implant for restorative and reconstructive surgery includes two casting steps performed in a casting mold. The mold has at least a cover that is optically and UV transparent. In a first step, a first layer of a first photo-curable material or of a second photo-curable material is cast while forming a meniscus. Using one of two photo masks, the mold is irradiated with UV light to cure the first layer. In a second step, a second layer of either the first or the second photo-curable material is cast onto the cured first layer while forming a meniscus. After irradiating the mold again with ultraviolet light, unhardened photo-curable material is removed from the product by dissolving in a suitable solvent. After additionally irradiating the product with UV light, the product is soaked, separated from the mold, placed in isopropyl alcohol and then vacuum dried.

7 Claims, 1 Drawing Sheet

Figure 1:
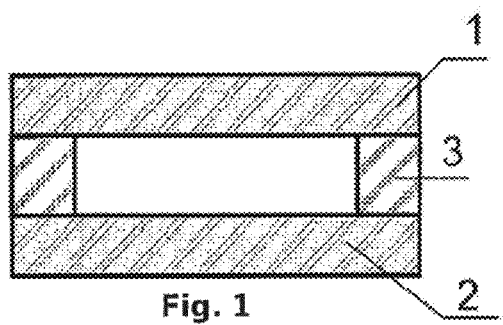

METHOD OF MANUFACTURING AN ARTIFICIAL ELASTIC IMPLANT FOR RESTORATIVE AN RECONSTRUCTIVE SURGERY

FIELD

The present invention relates to medicine, to surgery in particular, or, to be more specific, to a method of manufacturing an artificial elastic implant for restorative and reconstructive surgery.

BACKGROUND

It is often required that an artificial implant, designed for contact with body tissues (brain, intestines, etc.), should have a very high elasticity, a minimal impact on the surrounding organs and tissues of both similar types of surfaces and those of different structures and smoothness. In surgical interventions with the use of artificial implants it is sometimes necessary that the implant should be penetrated by the connective tissues, such as after an inguinal hernia plasty. In other cases, it is necessary that the implant does not move on its one side and is able to slide on the tissues on its other side, like after the dura mater plasty in neurosurgical operations. It is also critical to ensure that the implant should provide for an areactive postoperative period, have high biological stability, as it is designated for a lifetime implantation into the human body. The implants currently used in surgical practice are made of polymeric material, such as polypropylene, polytetrafluoroethylene, polyethylene terephthalate, nylon, collagen, and others. However none of these satisfy the range of properties needed for a successful surgery and a comfortable life of the patient in the postoperative period.

The main disadvantages of these materials are: their biological instability, excessive rigidity, changes in the geometric dimensions with shrinkage of up to 30% of its original size, which, of course, leads to the trauma of the tissues and to the need for a repeated surgery. Excessive roughness of the surface, the knots in the places of the entanglement of mesh fibers, that are used in hernioplastics, for instance, force many surgeons to abstain from using these materials, which lowers the level of surgical care for the patients. However, getting rid of these disadvantages of these implants does not seem possible within the framework of the known methods of manufacture, which consist of weaving the implants from fibers, and of machining the rough polymer pieces.

There are methods known for manufacturing artificial implants made of elastic photo-cured materials, such as artificial eye lenses. One of the known methods is that of manufacturing an artificial eye lens according to the U.S. Pat. No. 2,132,662 from elastic material with supporting elements made from a polymer fiber, polypropylene. However, this method does not produce an implant that has minimal impact on the surrounding tissue. Another known method is that of manufacturing an artificial eye lens of two photo-curable materials according to U.S. Pat. No. 2,242,189. However, this way it is not possible to get an implant having surfaces of either different structures and smoothness. There is another method of manufacturing artificial eye lenses according to U.S. Pat. No. 6,201,036 (taken as the prototype), in which the implant is made of an elastic material. However, it is not possible to use this method to produce an implant that has different structures of surfaces, thus having minimal impact on the surrounding tissues and organs.

SUMMARY

Exemplary embodiments described herein include methods that allow the production of an implant, which has high elasticity and minimal impact on the surrounding organs and tissues, which has a high biological stability and providing for areactivity in the post-operative period. The method should also allow producing implants having a uniform surface, either smooth or structured, as well as implants having different partial surfaces, like one smooth and one structured.

This technical problem is solved by a method in accordance with claim 1.

Many ingredients used in the exemplary method are commercially available chemicals well-known to the skilled person in the field of polymers. For the oligourethans the following structures apply:

Oligourethane methacrylate 1000F of the following structure:

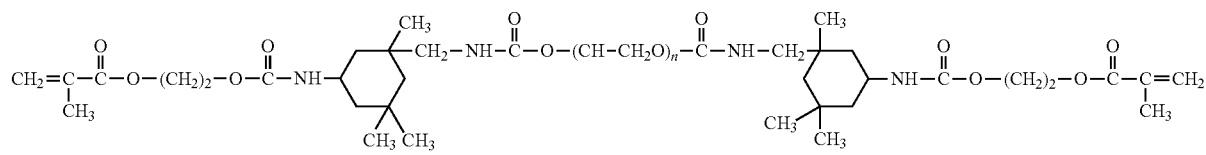

Oligourethane methacrylate 5000F of the following structure:

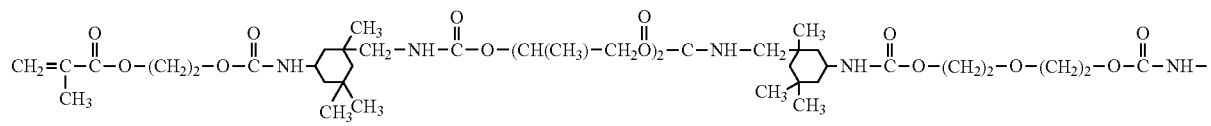

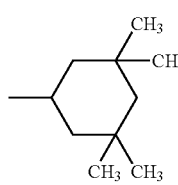 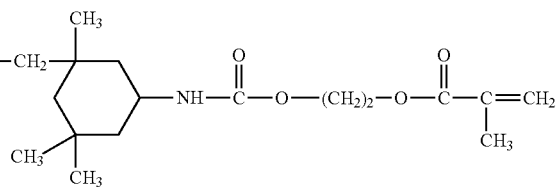

The casting mold, at least the cover, is made from a material which is transparent for visible light as well as UV light in the spectral region needed for photo polymerization. Suitable materials are UV transparent glass, plastic. The cover can accommodate the photomask into a suitable cavity. The base and the limiting ring can as well be made from other materials like metal, ceramics, plastic. In the present method the mold is not completely filled by the photo polymerizable material. Moreover the material forms a meniscus in its upper region. A meniscus is a free surface of liquid, the shape of which forms under the influence of gravity and the surface energies of the surfaces involved. The surface of the meniscus will remain very smooth during first curing.

It should be noted, that pouring on the material takes place before the limiting ring is being placed on to the base. That means that the amount of photo polymerizable material must be small enough to avoid the material flowing to the rim of the base and from there down.

The photomask is either the first photomask defining the outer geometrical dimensions of the product to be formed, for example a circular, elliptical or square shape, or the second photomask, which on irradiation forms the structure on the surface of the product and is in the form of numbers, letters, meshes, shapes corresponding to the embossed pattern on the surface of the formed product.

After closing the mold it is irradiated with UV light suitable to photo-cure the material. In this first irradiation it is intended to cure the material all the way from top to bottom of the layer. After irradiation the cover and limiting ring are re removed and again photo polymerizable material is being poured onto the object just formed, again while forming a meniscus. The mold is again closed and irradiated. This time the photomask is the stencil for the intended surface structure of the product. This may for example be a pattern of shallow dimples or narrow ribs which are to improve the adherence of growing tissue after implantation. It may also be in the form of numbers, letters, meshes, shapes corresponding to the embossed pattern on the surface of the formed product Alternately the first photomask could be used as well in the second step.

After the mold has been opened, excess unhardened photocurable material is being removed by dissolving it in a suitable solvent. In this step the final shape of the product is determined. Suitable solvents include without being limited to, lower alcohols like ethanol, methanol, propanol, propanol ketones like propanone, 4-methyl-pentan-Z-one and butanone as well as mixtures of these.

In order to remove all residual monomers which are left in the cured material and could irritate surrounding tissue after implantation, a final UV exposure is now done, followed by soaking the product in hot water of 90 to 100° C. for at least 30 min.

Up to now the product was still adhered to the mold base. It is now separated from the base and placed in the closed container with Isopropanol at the temperature of between −22 and +12° C. for 3 to 24 hours. After vacuum drying the product is ready.

The formulation of the photocurable material is based upon acrylates and is as follows:

The first photo-curable material is a composition comprising
25-40 wt.-% benzyl methacrylate
50-70 wt.-% oligourethane methacrylate
1-5 wt.-% methacrylic acid
1-5 wt.-% octyl methacrylate.

The second photo-curable material is a composition comprising
20-30 wt.-% phenoxyethyl methacrylate
20-30 wt.-% oligourethane methacrylate 1000F
35-45-wt.-% oligourethane methacrylate 5000F
1-5 wt.-% methacrylic acid
1-5 wt.-% ethylene glycol monomethacrylate.

The optimal composition has to be determined by pretests.

The formulation advantageously contains other ingredients which are common in the field of photocurable materials. These are for example effective amounts of additives capable of initiation of radical polymerization, optical sensitization and/or inhibiting thermal polymerization, dyes or pigments, stabilizers, and the like. Examples are 3,5-di-t-butyl-o-quinone, azo-bis-isobutyronitrile, 3,5-di-t-butyl-o-quinone and/or 2,2-dimethoxyphenylacetophenone.

The invention will be further explained by means of the accompanying drawings, which show specific embodiments of the mold used.

DRAWINGS

Figure 4:
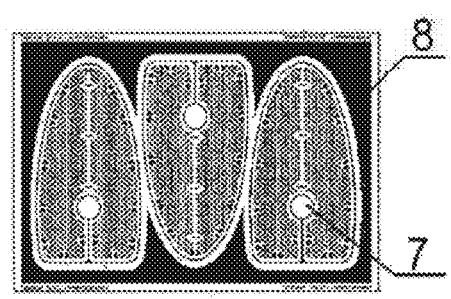
Figure 5:
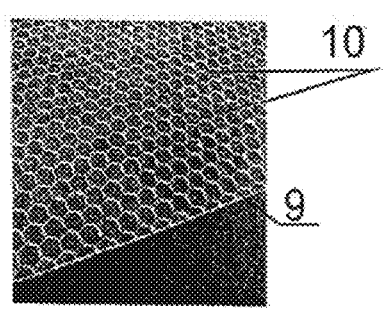
Figure 6:
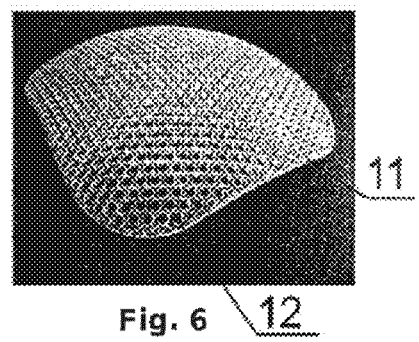

The drawings show:
FIG. 1—a mold consisting of upper and lower parts,
FIG. 2—the lower part of the mold with light-sensitive material forming a meniscus in step 1,
FIG. 3—the upper part of the mold with limiting ring, cover, and photo-mask, protected by PET-film,
FIG. 4—the photo-mask having transparent and opaque areas in the form of numbers, letters, meshes, shapes corresponding to the embossed pattern on the surface of the formed product.
FIG. 5—an implant, that has two surfaces different in structure—a smooth one and a relief one,
FIG. 6—an implant having a surface structure that could be penetrated by the connective tissues of the body.

DETAILED DESCRIPTION

Figure 2:
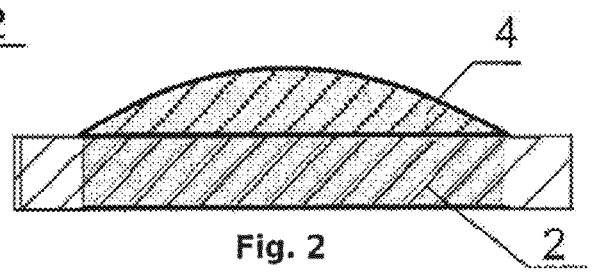
Figure 3:
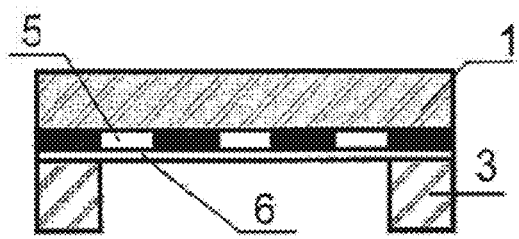

FIG. 1 shows the section of the mold used in the process of the invention. It consists of a base, 2, a cover 1, and the limiting ring 3, FIG. 3 shows the upper part of the mold equipped with a photomask 5, which is protected by PET-film 6. FIG. 2 shows the photocurable material 4, which had been poured onto the base 2 and forms the meniscus on its upper surface.

One embodiment of the method of making implants according to the invention works as follows.

To manufacture elastic artificial implants for restorative and reconstructive surgery a casting mold is used consisting of two parts made for example of optically transparent material such as glass (FIG. 1).

Onto the lower part of the mold the first photo-curable material is poured, consisting of:
benzyl methacrylate—31.68 wt. %;
methacrylic acid—1.97 wt. %;
octyl methacrylate—1.97 wt. %;
dinitrilazo-bis-isobutyric acid—0.005 wt, %;
2,2-dimethoxy-phenylacetophenone—0.88 wt. %;
3,5-di-t-butyl-o-quinone—0.01 wt. %;
inorganic pigment ultramarine 463—1.0 wt. %;
oligourethane methacrylate—the rest,
with the formation of the tipper meniscus (FIG. 2).

The base 2 is covered with the upper part of the mold, in which the limiting ring 3 and the photo-mask 5 corresponding to the outer geometrical dimensions of the product to be formed and protected by the PET-film 6 are fixed to the cover (1, see FIG. 3). The two parts of the mold are firmly pressed together and irradiated with UV light, the wave length being 360-380 nm, all over the entire surface of the upper part of the mold. The irradiation time is determined empirically so that the curing of the photosensitive composition takes place all the way through the depth of the layer. Then the parts of the mold are separated and onto the lower part of the mold with the layer that has just been formed, the second liquid photosensitive material is poured forming the meniscus, the composition of the second material being:
oligourethane methacrylate 1000E—25.8 wt. %,
phenoxyethyl methacylate—25.6 wt. %,
methacrylic acid—4.46 wt. %,
mono methacrylic ethylene glycol ether—4.46 wt. %,
dinitrilazo-bis-isobutyric acid—0.005 wt. %,
2,2-dimethoxy-phenylacetophenone—0.775 wt. %,
3,5-di-t-butyl-o-quinone—0.01 wt. %,
oligourethane methacrylate 5000F—the rest.

The base 2 is covered with the upper part of the mold on which are fixed the limiting ring and the photo-mask (FIG. 4) having transparent and opaque areas in the form of numbers, letters, meshes, shapes corresponding to the embossed pattern formed on the surface of the product, protected by PET-film 6. The two parts of the mold are then firmly pressed together and the mold is irradiated all over the entire surface of the upper part of the mold. Then the mold parts are separated. The product stays on the base of the mold with the remnants of the uncured liquid material that during the time of irradiation was under the opaque areas of the photo-mask. The product is carefully developed in a suitable solvent such as isopropyl alcohol, then the resulting product, without separating it from the mold, is additionally irradiated with UV light for 3-10 min. in bidistilled water at T=40-60° C. Then the mold is additionally placed into a container with bidistilled water and is soaked for 30-45 minutes at a constant T=100° C. Next, the product is separated from the mold and placed in a closed container with isopropyl alcohol for 3-24 hours at the temperature of −20 C to +12° C., after which the product undergoes a thermal vacuum drying at 40-70° C. for 1-6 hours.

This way it is possible to make implants that have two types of surfaces different in structure (FIG. 5): a smooth lower surface, which was in contact with the surface of the base, and a structured surface created by irradiation through the corresponding phototmask. This letter surface will after implantation grow together with the adjacent tissue. This smooth surface will not grow together with the tissue and will remain movable. Thus generation of stress around the implant is avoided. In another embodiment of the method of the invention it is possible to provide both surfaces with structure or even both surfaces without the surface structure.

The following working examples and application tests are a further illustration of the method of the invention:

EXAMPLE 1

To manufacture elastic artificial implants for restorative and reconstructive surgery a casting mold is used consisting of two parts made of glass (FIG. 1).

Onto the lower part 2 of the mold a first light-sensitive material 4 (number 1) is poured, consisting of:

| | |
|---|---|
| benzyl methacrylate | 31.68 wt. %; |
| methacrylic acid | 1.97 wt. %; |
| octyl methacrylate | 1.97 wt. %; |
| dinitrilazo-bis-isobutyric acid | 0.005 wt. %; |
| 2,2-dimethoxy-phenylacetophenone | 0.88 wt. %; |
| 3,5-di-t-butyl-o-quinone | 0.01 wt. %; |
| inorganic pigment ultramarine 463 | 1.0 wt. %; |
| oligourethane methacrylate | the rest, |
| whereby an upper meniscus is formed (FIG. 2). | |

The lower pan of the mold with the first light sensitive material is covered with the upper part of the mold on which are fixed the limiting ring 3 and the photo-mask 5, which corresponds to the outer geometrical dimensions of the product to be formed and which is protected by the PET-film 6 (FIG. 3). The two parts of the mold are firmly pressed together and irradiated with UV light of a wave length between •=360-380 nm, all over the entire surface of the upper part of the mold. The irradiation time is determined empirically so that the curing of the photosensitive composition takes place all the way through the depth of the layer. Then the parts of the mold are separated and onto the lower part of the mold with a layer that has just been formed, a second liquid photosensitive material number 2 is poured together with the meniscus. This second material has the following composition:

| | |
|---|---|
| oligourethane methacrylate 1000F | 25.8 wt. %; |
| phenoxyethyl methacrylate | 25.6 wt. %; |
| methacrylic acid | 4.46 wt. %; |
| mono methacrylic ethilene glycol ether | 4.46 wt. %; |
| dinitrilazo-bis-isobutyric acid | 0.005 wt. %; |
| 2,2-dimethoxy-phenylacetophenone | 0.775 wt. %; |
| 3,5-di-t-butyl-o-quinone | 0.01 wt. %; |
| oligourethane methacrylate 5000F | the rest. |

The lower part 2 of the mold is covered with the upper path on which are fixed the limiting ring 3 and the photo-mask 5 (FIG. 4) having transparent and opaque areas in the form of numbers, letters, meshes, shapes corresponding to the embossed pattern formed on the surface of the product to be formed, and which is protected by PET-film. The two parts of the mold are then firmly pressed together and the mold is irradiated all over the entire surface of the upper part of the mold. Then the mold parts are separated. The product stays on the lower part of the mold with the remnants of the uncured liquid material that during the time of irradiation was under the opaque areas of the photo-mask. The product is carefully developed in isopropyl alcohol, then the resulting product, without separating it from the mold, is additionally irradiated with UV light for 3-10 min, in bidistilled water at 1=40-60° C. Then the mold with the product is again placed into a container with bidistilled water and is soaked for 30-45 minutes at a constant T=100° C. Next, the product is separated from the mold and placed in a closed container with isopropyl alcohol for 3-24 hours at the temperature of −20C to +12° C., after which the product undergoes a thermal vacuum drying at 40-70° C. for 1-6 hours. In this way an implant is produced, that has two types of surfaces different in structure (FIG. 5), so the implant does not move on its one side and can move freely on its other side, sliding on the tissues. Such an implant can be used, for instance, in neurosurgery of the brain or spinal cord to reduce the trauma of the tissues and to provide for an areactive postoperative period.

Patient Z., female, born 1947, admitted to hospital 25 Jan. 2008 MLPU "City Clinical Hospital No 39" of the city of Nizhny Novgorod, with a diagnosis of meningeoma in the leftfrontal region. 29 Jan. 2008 the patient underwent resection craniotomy, the meningeoma was removed. As a result of the removal of the tumour originating from the dura mater, a 3×3 cm defect of the dura mater was formed. The plasty of the defect was performed using plastic implants for the dura mater plastic defects. The postoperative period went without complications. 13 Feb. 2008 the patient was discharged to outpatient treatment.

EXAMPLE 2

An artificial elastic implant for restorative and reconstructive surgery is made as in Example 1, but, before the developing takes place, onto the lower part of the mold with the layer that has just been formed, the liquid photosensitive material number 1 is poured to form a meniscus. In this way an implant is produced, which has surfaces different in structure but identical in elasticity (FIG. 5); such an implant can be used, for instance, for complicated neurosurgical interventions on the brain—in case of swelling or dislocation to reduce the trauma of tissues and to provide for areactivity in the post-operative period.

Patient K., male, age 43 was hit by a car Oct. 4, 2008 and admitted to MLPU "City Clinical Hospital No 39." The MR-tomograms of the patient revealed an acute subdural hematoma in the right fronto-temporo-parietal region, causing a 4 mm dislocation of the brain to the left. Oct. 5, 2008 the patient underwent resection craniotomy in the right temporo-parietal region, and the removal of acute subdural hematoma. After the removal of the subdural hematoma, the brain spread out into the burr window, which formed a TMO defect. Plasty using the implant in question was performed. In the immediate postoperative period the patient's condition slightly improved: the restoration of consciousness to a deep stunning. But 8 days later the patient re-booted into the 1st stage coma. MR-tomography was done again. It revealed a delayed injury—a bruise and crush of the left temporal lobe, causing dislocation of midline structures to the right by 3 mm. Oct. 13, 2008 the patient was subjected to decompressive craniotomy in the left temporo-parietal region, removing the source of injury—a bruise and crush of the left temporal lobe. Plasty of TMO using the implant in question was performed as well. The postoperative period was uneventful. The patient's condition gradually improved and on November 21 in a satisfactory condition he was discharged for outpatient treatment to a neurologist. In the neurological status moderate cognitive and mnestic violations were retained. Feb. 10, 2009 the patient was re-hospitalized for cranioplasty. February 14th the patient underwent Xeno-cranioplasty in both temporo-parietal regions. It should be noted that between the brain, the implant and the overlying soft tissues no scar adhesions had formed, due to which the surgery duration was decreased.

EXAMPLE 3

An artificial elastic implant for restorative and reconstructive surgery is made as in Example 1, but, before superimposing the upper pan of the mold on the lower part of the mold, the liquid photosensitive material number 2 is poured to form the meniscus. This way we receive an implant that has surfaces different in structure but identical in elasticity (FIG. 5):

parietal that is intended for contacting with the abdominal wall, and visceral that is intended for contacting with the abdominal cavity, which allows to use it, for example, for reconstructive surgery of the abdominal wall by the intra-abdominal (intraperitoneal) plasty, to reduce the trauma of tissues and to provide for areactivity in the post-operative period.

EXAMPLE 4

An artificial elastic implant for restorative and reconstructive surgery is made as in Example 1, but, before superimposing the upper part of the mold on the lower part of the mold, liquid photosensitive material, number 1 is poured together with the meniscus, then it is covered with the upper part of the mold on which are fixed the limiting ring and the photo-mask having transparent and opaque areas in the form of numbers, letters, meshes, shapes corresponding to the embossed pattern formed on the surface of the product, protected by PET-film, the two parts of the mold firmly pressed together, irradiated all over the entire surface of the upper part of the mold. This way we get an implant having a surface structure that could be penetrated by the connective tissues of the body; this implant can be used, for example, in the surgery of inguinal hernias according to the method of Lichtenstein, to reduce the trauma of tissues and to provide for areactivity in the post-operative period.

Patient S., male, age 52, admitted to MLPU "City Hospital No 35" 28 Oct. 2007 by emergency service. He was brought in by an emergency team with complaints of severe pain in the right inguinal region, repeated vomiting, the presence of a painful protrusion of the right groin. On examination, he was diagnosed with incarcerated inguinal-scrotal hernia on the right. Based on these emergency indications a surgery was performed—herniotomy using the above-described implant, Smooth post-operative period. Healing by first intention. Suppuration, seromas, infiltrates and fistula were not noted. Discharged in satisfactory condition on day 7, Examined in six weeks. The plasty zone was consistent. No signs of relapse of hernia. An ultrasound scan of the implantation area revealed no liquid formation. The implant was without signs of deformation or dislocation.

EXAMPLE 5

An artificial elastic implant for restorative and reconstructive surgery is made as in Example 1, but, before superimposing the upper part of the mold on the lower part of the mold, liquid photosensitive material number 2 is poured to form a meniscus, then it is covered with the upper part of the mold on which are fixed the limiting ring and the photomask having transparent and opaque areas in the form of numbers, letters, meshes, shapes corresponding to the embossed pattern formed on the surface of the product, protected by PIT-film, the two parts of the mold firmly pressed together, irradiated all over the entire surface of the upper part of the mold. This way we get an implant having a surface structure that could be penetrated by the connective tissues of the body; this implant can be used, for example, in the surgery of inguinal hernias according to the method of Trabucco, to reduce the trauma of tissues and to provide for areactivity in the post-operative period.

Patient B., male, age 57, was admitted on an emergency basis with severe pain in the left inguinal region. He reported that he had had a bilging in this area for many years, which of yesterday stopped going back into the abdomen and became acutely painful. When examined at MLPU "City Hospital No 35," 28, Nov. 2007, he was diagnosed with incarcerated inguinal-scrotal hernia on the left. Based on these emergency indications a surgery was performed —herniotomy using the above-described implant. Postoperative period went without complications. Seromas, suppuration, infiltration in the area of operations was not observed. The wound healed by first intention. Discharged in a satisfactory condition on day 6.

EXAMPLE 6

An artificial elastic implant for restorative and reconstructive surgery is made as in Example 1, but after additional irradiation with UV light, the mold is additionally placed into a container of bidistilled water at constant T=20° C. to soak for 30-45 minutes. Preclinical toxicity study of aqueous extract of the implant according to GOST R ISO 10993-11-2009 by ultraviolet spectroscopy showed the exceeding of the allowable values by 0.2 OP units (the maximum allowed OP value of the aqueous extract is 0.15). No clinical studies were conducted.

EXAMPLE 7

An artificial elastic implant for restorative and reconstructive surgery is made as in Example 1, but after additional irradiation with UV light, the mold is additionally is placed into a container of bidistilled water at constant T=100° C. to soak for 3 minutes. Preclinical toxicity study of aqueous extract of the implant according to GOST R ISO 10993-11-2009 by ultraviolet spectroscopy showed the exceeding of the allowable values by 0.12 OP units (the maximum allowed OP value of the aqueous extract is 0.15). No clinical studies were conducted.

In all these examples 1, 2, 3, 4, where the parameters of the method of manufacturing the implant correspond to the invention formula, the implants have high elasticity, a minimal impact on the surrounding organs and tissues, have both the same types of surfaces and the surfaces that vary in texture and smoothness, are of high biological stability, provide for areactivity in the post-operative period. Deviations from the method that strictly follows the invention formula (Examples 6, 7) lead to the formation of the implant that does not have a low enough toxicity, which can have negative effects on living tissue.

The invention claimed is:

1. Method for manufacturing an artificial elastic implant for restorative and reconstructive surgery, comprising the steps
   a) providing a casting mold comprising a base (2), a limiting ring (3) and a cover (1), wherein at least the cover is optically and UV transparent and comprises a first or second photo mask (5),
   b) casting in a first step a first layer of a first or second liquid photo-curable material onto the base (2) of the mold while forming a meniscus (4),
   c) closing the mold by placing the limiting ring (3) and the cover (1) with the photo mask (5) on the margin of the base (2), whilst the photo mask is a first photo mask corresponding to the outer geometrical dimensions of the product to be formed or is a second photo mask corresponding to the pattern to be formed on the surface of the product,
   d) irradiating the mold with ultraviolet light for a time sufficient to cure the photo-curable material all the way through the depth of the layer,
   e) removing the cover and limiting ring from the base,
   f) casting in a second step a second layer of a first or second photo-curable material onto the base and the cured first layer while forming a meniscus,
   g) closing the mold by placing the limiting ring and the cover on the margin of the base, whilst the photo mask is a first photo mask corresponding to the outer geometrical dimensions of the product to be formed or is a second photo mask corresponding to the pattern to be formed on the surface of the product,
   h) irradiating the mold again with ultraviolet light,
   i) opening the mold and removing the unhardened photo-curable material from the product by dissolving in a suitable solvent,
   j) additionally irradiating the product with UV light,
   k) soaking the product in water at 80 to 100° C. for at least 30 min,
   l) separating the product from the mold base and placing it in a closed container with isopropyl alcohol at a temperature of −20 to +12° C. and it keeping there for 3 to 24 hours,
   m) vacuum drying the first product at temperatures above 70° C. for 1 to 6 hours; wherein
   n) the first photo-curable material is a composition comprising
      25-40 wt.-% benzyl methacrylate
      50-70 wt.-% oligourethane methacrylate
      1-5 wt.-% methacrylic acid
      1-5 wt.-% octyl methacrylate and
   o) the second photo-curable material is a composition comprising
      20-30 wt.-% phenoxyethyl methacrylate
      20-30 wt.-% oligourethane methacrylate 1000F
      35-45-wt.-% oligourethane methacrylate 5000F
      1-5 wt.-% methacrylic acid
      1-5 wt.-% ethylene glycol monomethacrylate.

2. The method according to claim 1, wherein in both steps the first photo-curable material is used.

3. The method according to claim 1, wherein in both steps the second photo-curable material is used.

4. The method according to claim 1, wherein the first photo-curable material is used in the first step and the second photo-curable material is used in the second step.

5. The method according to claim 1, wherein the second photo mask is used in both steps.

6. The method according to claim 1, wherein the photo-curable materials further comprise effective amounts of additives capable of initiation of radical polymerization, optical sensitization and/or inhibiting thermal polymerization.

7. The method according to claim 6, wherein the photo-curable materials comprise effective amounts of 3,5-di-t- butyl-o-quinone, azo-bis-isobutyronitrile, 3,5-di-t-butyl-o-quinone and/or 2,2-dimethoxypheny-lacetophenone.

* * * * *